United States Patent [19]
Yoshida

[11] Patent Number: 4,640,598
[45] Date of Patent: Feb. 3, 1987

[54] POWER WINDER ATTACHMENT FOR A CAMERA

[76] Inventor: Taichi Yoshida, 2-4-8-903, Otsuka, Bunkyo-ku, Tokyo, Japan

[21] Appl. No.: 798,389

[22] Filed: Nov. 15, 1985

[51] Int. Cl.[4] .............................................. G03B 1/12
[52] U.S. Cl. .................................................. 354/173.1
[58] Field of Search ............... 354/173.1, 173.11, 212, 354/213

[56] References Cited

U.S. PATENT DOCUMENTS 4,258,997 3/1981 Fukahori et al. ............... 354/212 X
4,339,189 7/1982 Nakano ............................. 354/173.1
4,350,424 9/1982 Iwashita et al. .................. 354/173.1

*Primary Examiner*—Donald A. Griffin
*Attorney, Agent, or Firm*—Cushman, Darby & Cushman

[57] ABSTRACT

A housing adapted to be secured to a camera contains a battery-driven motor coupled to a gear. The gear supports a leaf spring which, when the gear is rotated, lifts a pin from within the housing into an auxiliary shutter-releasing socket within the camera, thereby operating the shutter. The gear also supports a lever which is moved during gear rotation into operating relationship with a winder mechanism extending from within the housing into the camera's film winding socket. Actuation of the winder mechanism causes the film to be advanced. Electrical circuitry is provided within the housing for controlling the operation of the motor through the selective energization of a relay.

10 Claims, 7 Drawing Figures

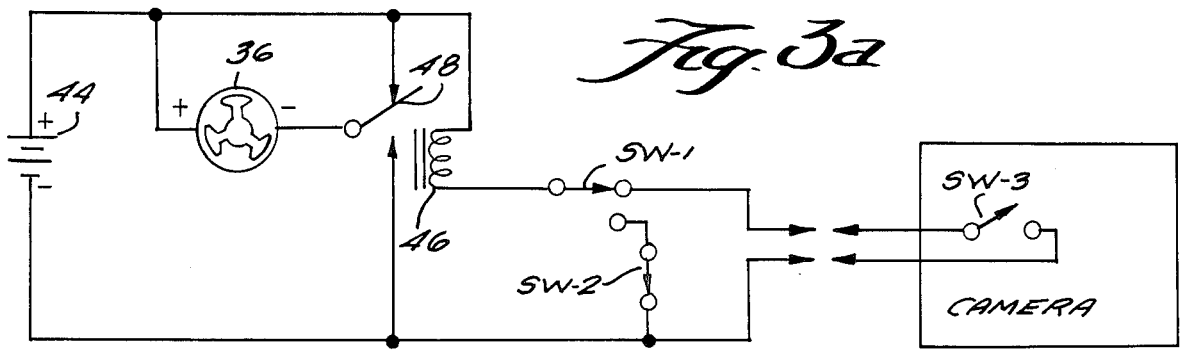
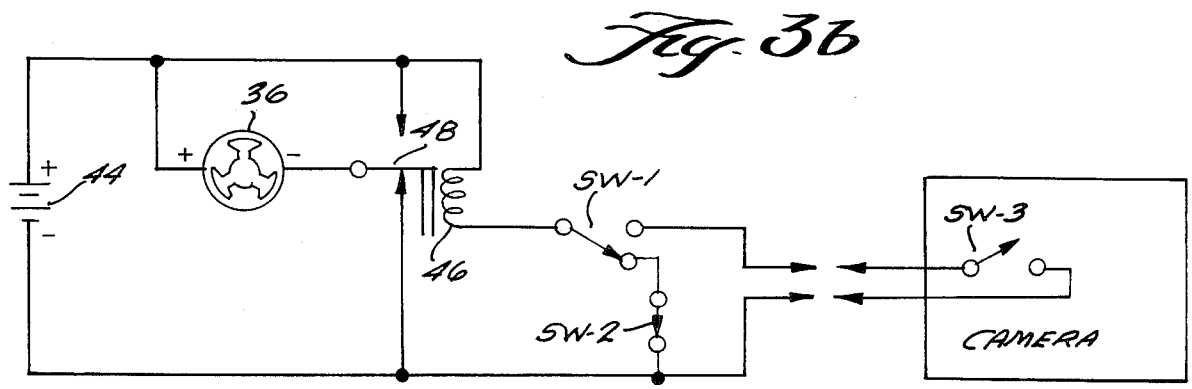
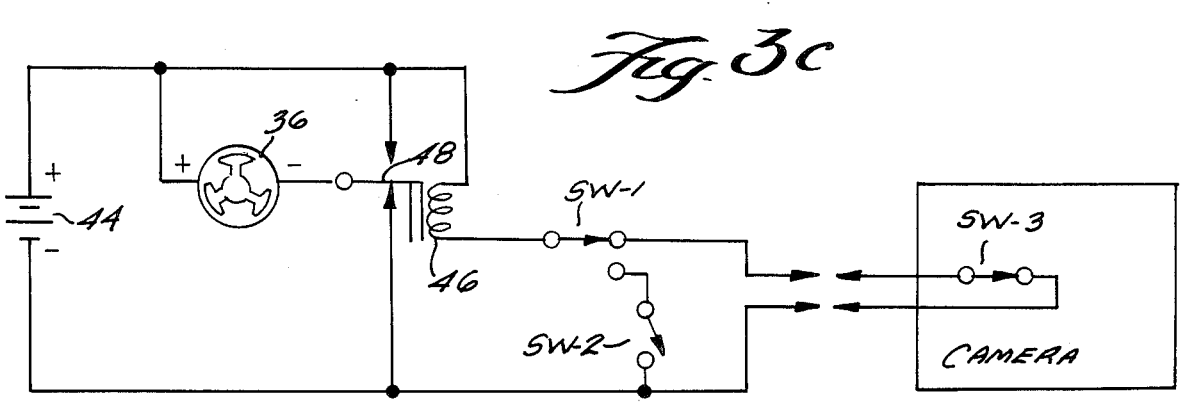

POWER WINDER ATTACHMENT FOR A CAMERA

BACKGROUND OF THE INVENTION

Commercially available cameras are adapted for use with various accessories, including a power winder for controlling the advance of film within the camera independently of the manually actuated device for that purpose provided on the camera itself. More particularly, such cameras have an extra shutter releasing socket, a film winding socket and power contacts located on the body of the camera which operatively interrelate with the winder when the latter is secured to the camera.

A power winder typically includes a shutter release button which controls a switch for completing a circuit to a solenoid which in turn functions to move a pin from within the winder into the camera's shutter releasing socket to thereby operate the shutter. The motor of the winder then actuates a mechanical arrangement which extends into the film winding socket so that the film is advanced.

The use of a solenoid in controlling the operation of the winder's shutter release pin represents an expensive component of the power winder. The present invention provides a more economical version of such a device in which the solenoid is eliminated and an improved power winding mechanism is provided.

SUMMARY OF THE INVENTION

Briefly, the invention comprises a housing which contains a battery-driven motor the output shaft of which is coupled to a gear journalled within the housing. The gear carries on its surface a leaf spring which, when the gear is rotated, lifts a pin from within the housing to enter the camera's auxiliary shutter releasing socket thereby operating the shutter. The gear also carries a spring-loaded lever the end of which is brought into engagement with a cam as the gear rotates. The cam is secured to a winder mechanism which projects through the housing into the camera's film winding socket. Consequently, the film is advanced when the lever engages and moves the cam.

The battery is connected to the winder motor through a relay contact. The coil of the relay is connected in series with a pair of switches within the housing. One of these switches is actuated by the operator of the camera when shutter release is desired. The other is positioned adjacent the gear so as to be opened by a pin projecting from the gear as the latter rotates. This opening interrupts current flow through the relay coil thereby opening the circuit through the winder motor, stopping its rotation.

DETAILED DESCRIPTION OF THE INVENTION

The invention will be described in greater detail with respect to the accompanying drawings wherein:

FIG. 3a is a schematic diagram illustrating the state of the circuitry for operating the power winder motor prior to release of the winder's shutter release button;

FIG. 3b is a schematic diagram illustrating the state of the power winder circuitry just after the shutter release button is actuated; and FIG. 3c is a schematic diagram illustrating the state of the power winder circuitry after the film has been advanced and just prior to the return of the circuitry to the condition illustrated in FIG. 3a.

Figure 1:
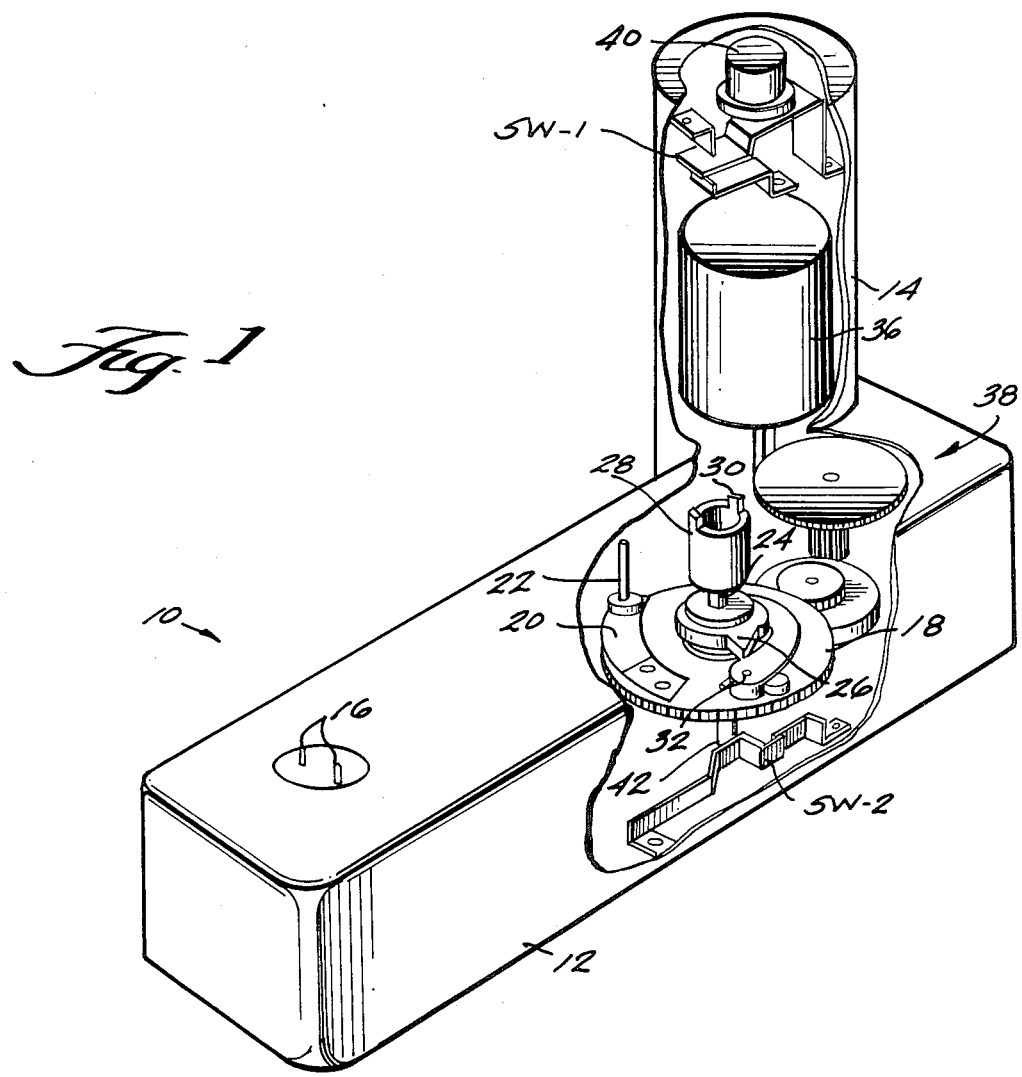
FIG. 1 is a perspective view illustrating how the various components of the invention are housed within a power winder housing.

Referring to the drawings, FIG. 1 illustrates the power winder as including a housing 10 having an elongated base portion 12 and an upwardly projecting cylindrical portion 14 located at one end of portion 12. The upper surface of portion 12 typically engages the underside of a camera. Accordingly, a pair of electrical contacts 16 project from the upper surface of portion 12 to interconnect with a socket typically found on a camera adapted for use with a power winder accessory. Representative examples of such cameras are the Nikon Models FE2 and FM2. The electrical interconnection joins the electrical circuits within the camera to those of the power winder.

A shutter release and film advancing mechanism also is contained within portion 12. More particularly, a gear 18 is journalled for rotational movement with portion 12. Adjacent its perimeter, gear 18 supports an upwardly inclined leaf spring 20 which is positioned such that each time the gear rotates, the free end of the spring lifts a pin 22 causing it to pass through the upper surface of portion 12 into the camera's extra shutter releasing socket thereby releasing the shutter.

Gear 18 also supports a film advancing mechanism. This mechanism is rotatable relative to the gear about the gear's rotational axis and includes a shaft 24 to which a winding cam 26 is fixed at a position immediately adjacent the upper surface of gear 18. At the free end of shaft 24, a cylindrical element 28 is provided which passes through the upper surface of portion 12. Element 28 includes a pair of winding claws 30 which extend within the film winding socket of a camera adapted to be used with a power winder accessory. Consequently, when the winding cam 26 is rotated, the claws 30 of element 28 are displaced to cause the film in the camera to be advanced.

Figure 2B:
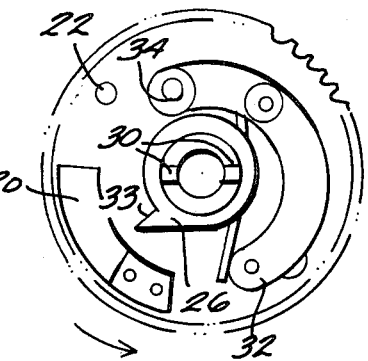
FIGS. 2a-2c illustrate the sequence of operation of the power winder mechanism in advancing film within a camera.
Figure 2A:
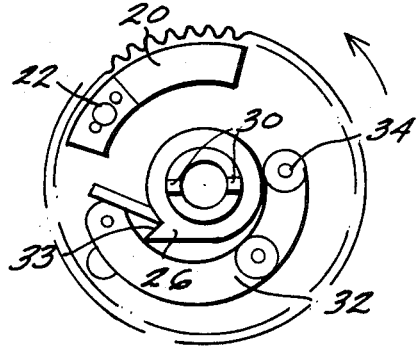
Figure 2C:
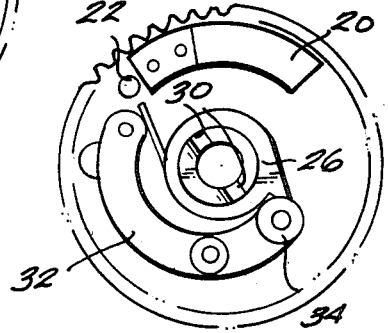

The sequence of operation in advancing film within the camera now will be described with reference to FIGS. 2a-2c.

Rotation of cam 26 is produced by an arcuately-shaped actuating lever 32 pivotally connected at one of its ends to gear 18. The free end of lever 32 is provided with a roller 34. When gear 18 rotates, the first event which occurs is that the leaf spring 20 moves from the position shown in FIG. 2a to that illustrated in FIG. 2c. During such movement, pin 22 is elevated to actuate the shutter in the manner described above. As rotation of gear 18 continues, the roller moves along the cam until it engages a projection 33 on the cam's surface. This engagement causes the cam to be rotated (FIG. 2c) resulting in the film being advanced.

Cam 26 and the free end of lever 32 are spring-loaded relative to one another. Thus, when the film advance operation is completed and further movement of cam 26 is prevented because of the interaction of winding claws 30 and the camera's film advancing mechanism at that time, the roller 34 passes over the cam projection as the gear 18 continues on to its original position shown in FIG. 2a. The spring simultaneously returns cam 26 (and thus element 28) to the FIG. 2a position.

Rotation of gear 18 is controlled by the operation of a motor 36 located within portion 14 of the power winder. The batteries (not shown) for driving the motor are contained within portion 12. Motor 36 is joined to gear 18 by a gear train 38.

The circuitry by which the foregoing operations are controlled is illustrated in FIGS. 3a–3c.

The power winder's shutter release button 40 is positioned at the upper end of portion 14. Button 40 has associated with it a switch SW-1 which is actuated when the button is depressed.

A second switch SW-2 is located in portion 12 of housing 10. This switch normally is closed but during each revolution of gear 18, it briefly is opened by a pin 42 which is secured to the underside of the gear adjacent its edge.

The batteries housed in portion 12 of housing 10 are indicated as 44 in FIGS. 3a–3c, and the manual shutter-operating switch provided in the camera is designated as SW-3. Coil 46 of a relay is connected between the battery 44 and switch SW-1, while the movable contact 48 of the relay is joined to one side of motor 36. The other side of the motor is connected to the battery 44.

During the quiescent state (FIG. 3a), there is no current flow since switch SW-3 is normally open and switch SW-1 is positioned so as to interrupt a path of current through the normally closed switch SW-2.

When the power winder's shutter release button 40 is actuated, however, the position of SW-1 is changed (FIG. 3b) so as to complete a circuit through relay coil 46. This causes contact 48 to be actuated to complete a circuit through motor 36. As a result, the camera's shutter is actuated by pin 22, and the film is advanced by element 28 both events occurring in the manner previously described. The brief opening of switch SW-2 as a result of its engagement by pin 42 as gear 18 rotates causes interruption of the energization of coil 46 regardless of whether SW-1 has been returned to the position shown in FIG. 3a by the release of the winder's shutter button 40. When coil 46 is deenergized, contact 48 returns to the position shown in FIG. 3a, and current flow to the winder motor 36 is interrupted.

In the event that button 40 is continuously maintained in the position shown in FIG. 3b, the brief opening and closing of SW-2 by pin 42 will cause the sequence of shutter release and film advance to be repeated in the manner just described.

The power winder can be employed independently of the winder's shutter release button 40 being actuated. As illustrated in FIG. 3c, when the camera's shutter release button closes switch SW-3, the relay coil 46 is energized, contact 48 is closed, and motor 36 operates to advance the film. During this sequence, the brief opening of switch SW-2 is of no effect, since this switch is not in the current flow path. The shutter release button of the camera does not permit SW-3 to be maintained in the closed position, however, so repetitive sequencing of shutter operation and film advancing does not occur automatically.

What is claimed is:

1. A power winder attachment adapted to be secured to a camera comprising:
    a housing;
    a battery-driven motor located within the housing;
    support means journalled for rotation within said housing;
    means for connecting the motor to said support means so as to rotate the support means during operation of the motor;
    a leaf spring secured at one of its ends to said support means;
    a shutter-release pin slidably retained by said housing and positioned so as to be engaged by the opposite end of the leaf spring as the spring is moved during rotation of the support means, said engagement between the spring and the pin causing the pin to slide outwardly from the housing;
    a film winder mechanism journalled within said housing; and
    winder actuator means joined to said support means for engaging the winder mechanism during rotation of the support means to pivot the winder mechanism in one direction from a first position to a second position and then to pivot the winder mechanism in the opposite direction to return the winder mechanism to said first position.

2. A power winder attachment as set forth in claim 1, wherein said support means comprises a gear which is coupled to an output shaft of said motor.

3. A power winder attachment as set forth in claim 2, wherein said leaf spring is mounted on a planar surface of said gear.

4. A power winder attachment as set forth in claim 1, wherein said film winder mechanism includes a cam and wherein said winder actuator means comprises a lever which engages the cam to cause the winder mechanism to pivot in said one direction to the second position.

5. A power winder attachment as set forth in claim 4, wherein said winder actuator means further comprises a spring extending between the lever and the support means, said spring being operative to retain the lever in engagement with the cam and to cause the winder mechanism to return to the first position.

6. A power winder attachment as set forth in claim 1, further comprising electrical circuitry within said housing for selectively energizing the battery-driven motor, said circuitry comprising:
    a first switch which is manually positionable;
    a second switch which is moved between closed and open positions during rotation of said support means; and
    a relay connected in series with at least one of said switches, said relay being energized by the battery to drive said motor when the second switch is closed and the first switch is positioned to complete a current flow path through said relay and both said first and second switches.

7. A power winder attachment as set forth in claim 1, further comprising means joined to the support means and movable during rotation of the support means for intermittently opening the second switch to interrupt said current flow path thereby deenergizing the motor.

8. A power winder attachment as set forth in claim 1, wherein:
    said support means comprises a gear which is coupled to an output shaft of said motor, the leaf spring being mounted on a planar surface of said gear; and wherein:
    said film winder mechanism comprises a cam, the winder actuator means including a lever which is spring-connected to the gear, said lever engaging the cam to first cause the winder mechanism to pivot in said one direction to the second position and then causing the winder mechanism to return to the first position.

9. A power winder attachment as set forth in claim 8, further comprising electrical circuitry within said housing for selectively energizing the battery-driven motor, said circuitry comprising:
- a first switch which is manually positionable;
- a second switch which is moved between closed and open positions during rotation of said support means; and
- a relay connected in series with at least one of said switches, said relay being energized by the battery to drive said motor when the second switch is closed and the first switch is positioned to complete a current flow path through said relay and both said first and second switches.

10. A power winder attachment as set forth in claim 9, further comprising means joined to the gear and movable during the gear's rotation for intermittently opening the second switch to interrupt said current flow path thereby deenergizing the motor.